United States Patent
Hara

(10) Patent No.: US 7,656,444 B2
(45) Date of Patent: Feb. 2, 2010

(54) IMAGE PROCESSING APPARATUS AND IMAGE PROCESSING METHOD

(75) Inventor: Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 11/770,363

(22) Filed: Jun. 28, 2007

(65) Prior Publication Data

US 2008/0007630 A1 Jan. 10, 2008

(30) Foreign Application Priority Data

Jul. 7, 2006 (JP) .............................. 2006-188690

(51) Int. Cl.
*H04N 9/64* (2006.01)
(52) U.S. Cl. .................... 348/246; 348/223.1; 348/330; 348/335
(58) Field of Classification Search ................. 348/246, 348/223.1, 300, 335
See application file for complete search history.

(56) References Cited

U.S. PATENT DOCUMENTS 6,897,425 B2    5/2005   Osada

FOREIGN PATENT DOCUMENTS

JP    2002-190979 A    7/2002
JP    2002-191053 A    7/2002

*Primary Examiner*—Jason Chan
*Assistant Examiner*—Usman Khan
(74) *Attorney, Agent, or Firm*—Canon U.S.A. Inc., I.P. Division

(57) ABSTRACT

A digital camera first carries out R component and B component interpolation processing on image data. Then, magnification chromatic aberration correction processing is carried out on the image data that has undergone R component and B component interpolation processing. Then, G component interpolation processing is carried out on the image data that has undergone magnification chromatic aberration correction processing. In carrying out G component interpolation processing, a determination is made as to the G components of which pixels to use in the interpolation processing based on R components or B components of the image data that has undergone magnification chromatic aberration correction processing.

9 Claims, 11 Drawing Sheets

IMAGE PROCESSING APPARATUS AND IMAGE PROCESSING METHOD

BACKGROUND OF THE INVENTION

1. Field of the Invention

The present invention relates to techniques of interpolating color components in pixels of image data.

2. Description of the Related Art

Digital cameras, which are now widespread, generally obtain a first set of image data, in which R (red) component pixel signals, G (green) component pixel signals, and B (blue) component pixel signals, are lined up in a Bayer arrangement, using photo-electric conversion. Then a second set of image data is obtained by executing on the first set of image data processes such as for example pixel interpolation processing, in which color components of pixels are interpolated, magnification chromatic aberration correction processing, in which chromatic differences of magnification are corrected, and distortion aberration correction processing, in which distortion aberration is corrected. This second set of image data is used for such purposes as display on a PC (personal computer) or the like.

Here it is known that the quality of the second set of image data varies depending on the manner in which the above-mentioned pixel interpolation and correction processes are carried out. Accordingly, pixel interpolation processing has been proposed (see Japanese Patent Laid-Open No. 2002-191053) that gives consideration to the reproducibility of high frequency components in order to improve the quality of the second set of image data. Furthermore, it is also known (see Japanese Patent Laid-Open No. 2002-190979) that pixel interpolation processing is to be carried out before magnification chromatic aberration correction processing.

A method of interpolating G components in pixel interpolation processing is described with reference to FIG. 2. As shown in FIG. 2, in image data obtained by an image sensor, R component pixel signals, G component pixel signals, and B component pixel signals are lined up in a Bayer arrangement. Here, since only a B component is present at a pixel 209 of a center in FIG. 2, a G component of the pixel 209 is interpolated based on surrounding G components in order to obtain a G component of the pixel 209.

At this time, a correlation of B components at two pixels above and two pixels below (a pixel 202 and pixel 204) from the pixel 209 (the pixel targeted for interpolation) and a correlation of B components at two pixels right and two pixels left (a pixel 206 and pixel 208) from the pixel 209 are compared. Then, a G component of the pixel 209 is interpolated based on the G component one pixel above and one pixel below or one pixel right and one pixel left (a pixel 201 and pixel 203, or a pixel 205 and pixel 207, respectively) in the direction having higher correlation from the pixel 209. In this way, by determining the pixels of G components to be used in pixel interpolation processing based on a result of comparing a correlation between color components, the reproducibility of high frequency components can be improved for G components and image quality can be improved.

Here, although the image quality of the second set of image data varies depending on the manner in which pixel interpolation and correction processes are carried out as described above, conventionally pixel interpolation processing has been carried out for each of the RGB components of the image data before magnification chromatic aberration correction processing.

However, due to chromatic differences of magnification in image data prior to magnification chromatic aberration correction processing being carried out, the positional relationship between different color components sometimes may not correspond correctly to the positional relationship of the color components of the object. Thus, when pixel interpolation processing is carried out under these conditions, the pixel interpolation processing is carried out based on unsuitable pixels, and there is a problem of reduced image quality in the image data that is obtained.

For example, the pixel 205 and pixel 206 are laterally adjacent in the example of FIG. 2, but since their color components are different, there is a possibility that the positions are displaced due to magnification chromatic aberration, and these may not necessarily be representing laterally adjacent pixels in the object. For this reason, determining the pixels to be used in interpolation processing for the G component of the pixel 209 based on a result of comparing a correlation between B components in the pixel 202 and pixel 204 and the correlation between B components in the pixel 206 and pixel 208 will not always result in improved image quality.

The present invention has been devised in light of these circumstances, and is characterized by providing a technique that improves the quality of image data obtained as a result of image processing in image processing that includes at least pixel interpolation processing and magnification chromatic aberration correction processing.

SUMMARY OF THE INVENTION

It is a feature of the present invention to solve the conventional problems.

According to an aspect of the present invention, there is provided an image processing apparatus that generates second image data by interpolating color components of pixels in first image data, which has been obtained by photo-electric conversion and includes first component pixel signals, second component pixel signals, and third component pixel signals, a number of the third component pixel signals being greater than a number of the first component pixel signals and also being greater than a number of the second component pixel signals. The image processing apparatus includes: a first interpolation unit that interpolates first components in pixels of third components and second components in the first image data; a second interpolation unit that interpolates second components in pixels of first components and third components in the first image data, a magnification chromatic aberration correction unit that carries out correction of chromatic differences of magnification in the first image data, which has undergone first component interpolation by the first interpolation unit and second component interpolation by the second interpolation unit; and a third interpolation unit that interpolates third components in pixels that do not include third components in the first image data, which has undergone correction of chromatic differences of magnification by the magnification chromatic aberration correction unit.

According to another aspect of the present invention, there is provided an image processing method that generates second image data by interpolating color components of pixels in first image data, which has been obtained by photo-electric conversion and in which first component pixel signals, second component pixel signals, and third component pixel signals, a number of the third component pixel signals being greater than a number of the first component pixel signals and also being greater than a number of the second component pixel signals. The image processing method includes: interpolating first components in pixels of third components and second components in the first image data; interpolating second components in pixels of first components and third components in the first image data; carrying out correction of chromatic differences of magnification in the first image data, which has undergone first component interpolation and second component interpolation; and interpolating third components in pixels that do not include third components in the first image data, which has undergone correction of chromatic differences of magnification.

Further features of the present invention will become apparent from the following description of exemplary embodiments with reference to the attached drawings.

DESCRIPTION OF THE EMBODIMENTS

Exemplary embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, all combinations of the features described in the embodiments are not always indispensable for the present invention.

First Embodiment

Figure 1:
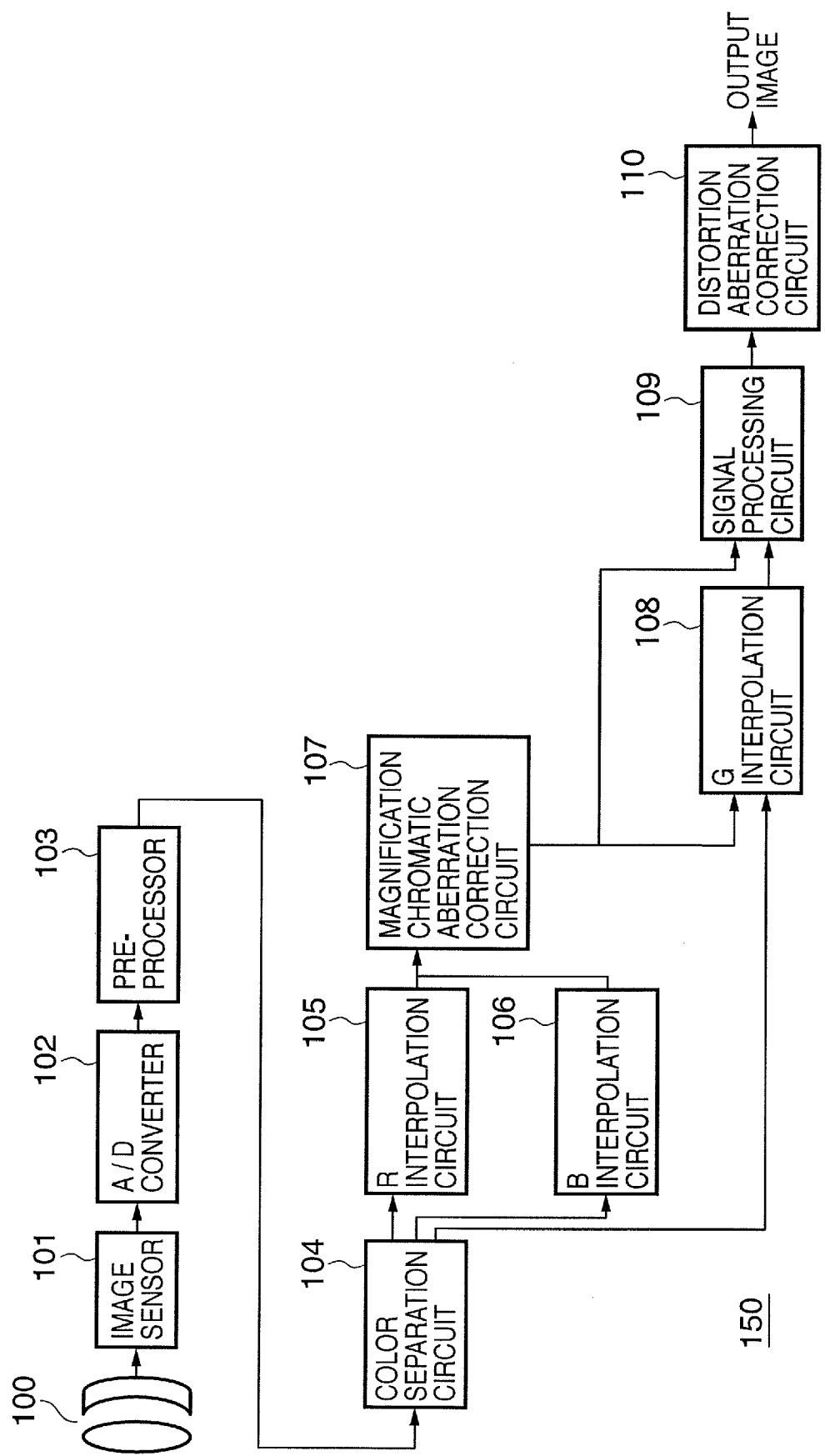
FIG. 1 shows a configuration of a digital camera according to a first embodiment.
Figure 2:
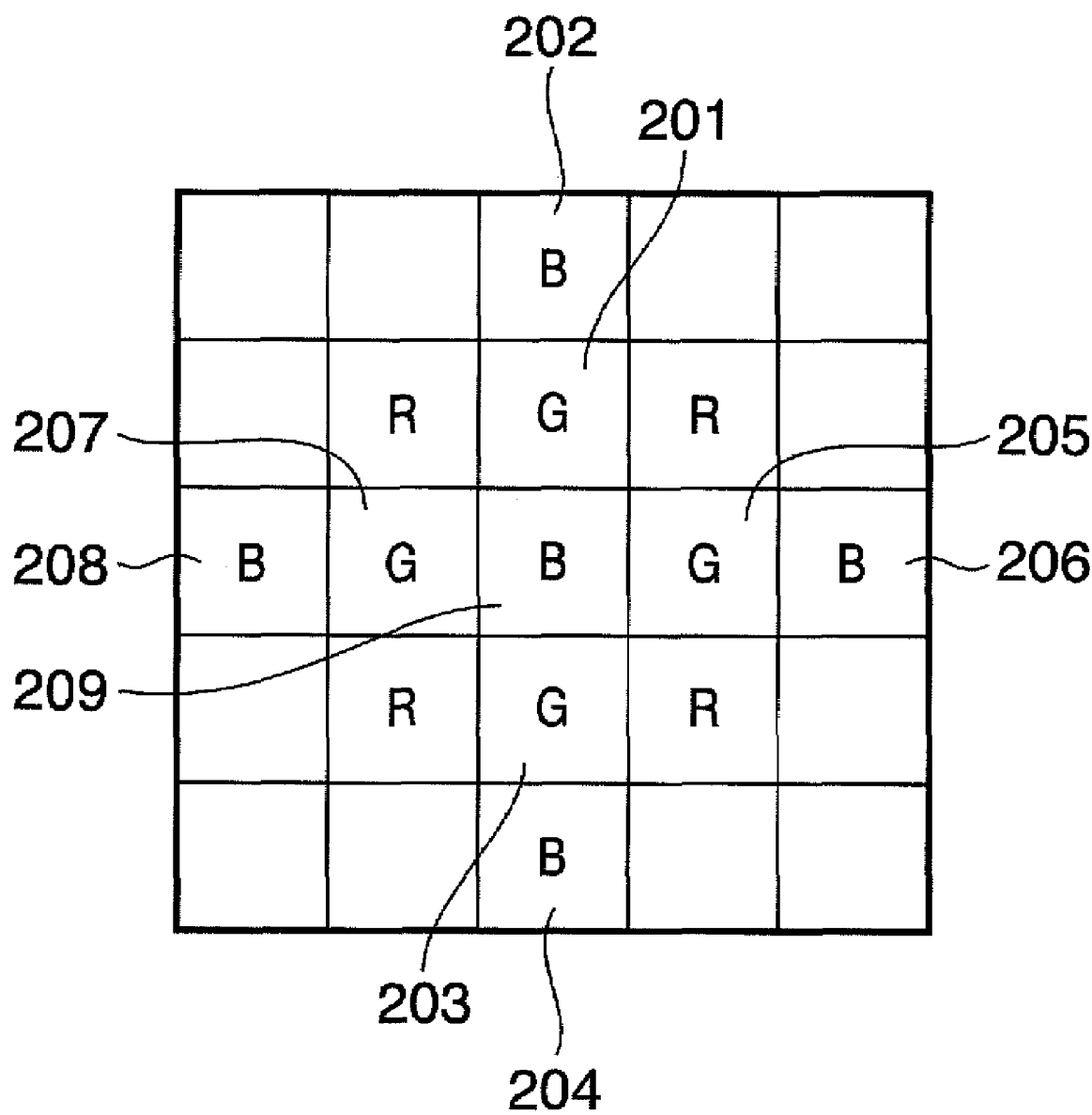
FIG. 2 is a diagram for describing a method of interpolating G components in pixel interpolation processing.

The image processing apparatus of the present invention is described with regard to an embodiment applied to a digital camera. FIG. 1 shows a configuration of a digital camera 150 according to the present embodiment. Hereinafter an example of image processing according the present embodiment is described using the digital camera 150, but the present invention is also applicable to image processing apparatuses not provided with an image capturing function. Furthermore, embodiments are also possible in which the image processing apparatus is achieved by operating application software on a PC (personal computer).

Furthermore, in addition to the functional portions shown in FIG. 1, the digital camera 150 may also be provided with such components as a CPU for performing overall control of the digital camera 150, a ROM for storing a control program of the digital camera 150, and a RAM that the CPU uses as a work area.

An optical lens 100 focuses light rays from an object onto an image sensor 101. The image sensor 101 is provided with color filters of a Bayer arrangement and subjects incident light rays to photo-electric conversion to generate analog image signals in which R component pixel signals, G component pixel signals, and B component pixel signals are lined up in the Bayer arrangement. An A/D converter 102 performs A/D conversion on the analog image signals generated by the image sensor 101 and generates digital image data (hereinafter simply referred to as "image data").

Here, the color components of the pixels have values indicating luminance (for example, a luminance value of an R pixel is referred to as an "R component value"). The luminance value of each color component is expressed as an integer from 0 to 255 for example, with 0 being the darkest and 255 being the brightest. That is, if the R component value is 0, then this means that the image sensor 101 has not detected any R component light at all, and if the R component value is 255, then this means the image sensor 101 has detected the brightest R component light in a detectable range.

A preprocessor 103 executes shading correction and defective pixel correction on the image data generated by the A/D converter 102.

Shading correction is a correction process for correcting falls in the luminance values of the color components originating in the reduction of light that occurs particularly at peripheral areas of the optical lens 100, and is carried out using information intrinsic to the optical lens 100. Information intrinsic to the optical lens 100 may be stored in a memory (not shown in the drawings) provided in the optical lens itself or a memory (not shown in the drawings) provided in the digital camera 150.

Figure 7:
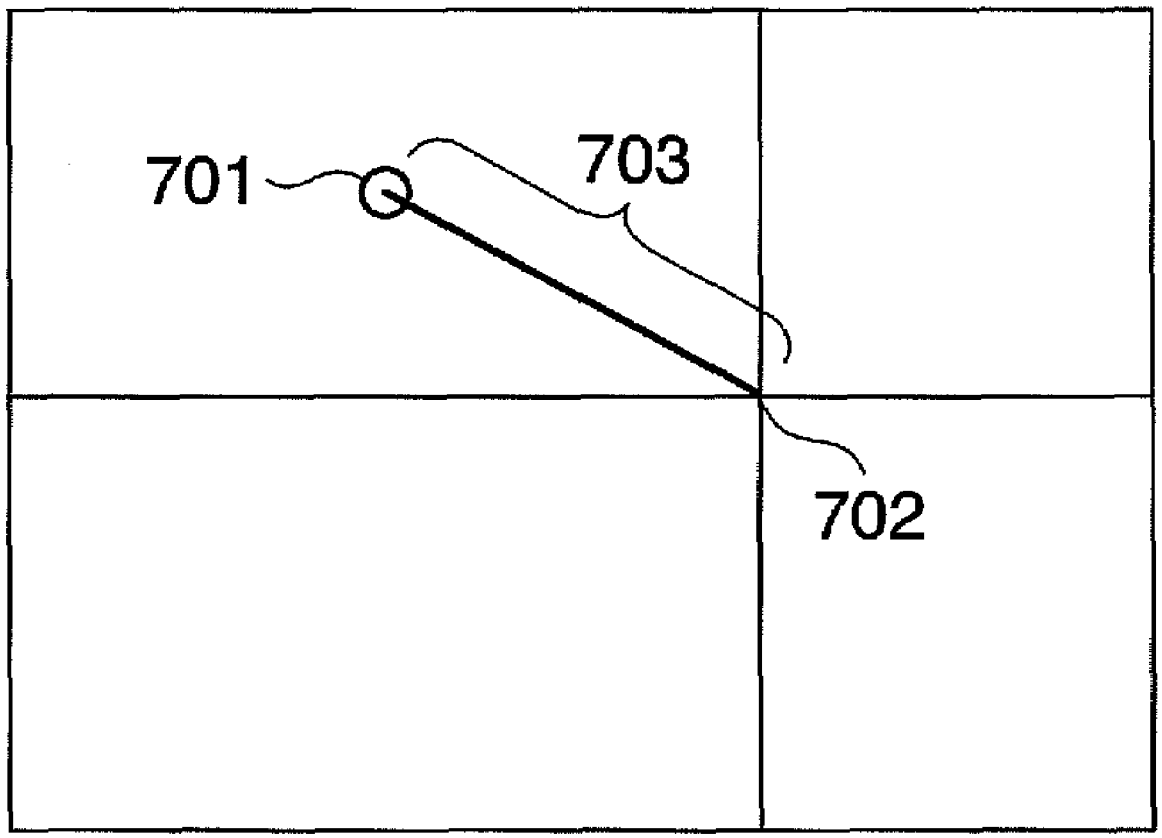
FIG. 7 shows an example of shading correction.

FIG. 7 shows an example of shading correction. Shading correction is performed by applying a predetermined gain to pixel color component values in response to an image height 703, which is a distance from an arbitrary pixel 701 to an optical center 702.

Defective pixel correction is a process of correcting defects in pixel signals, which occur due to the presence of defective locations (portions where photo-electric conversion cannot be carried out due to reasons such as malfunctioning) in the image sensor 101.

Figure 8:
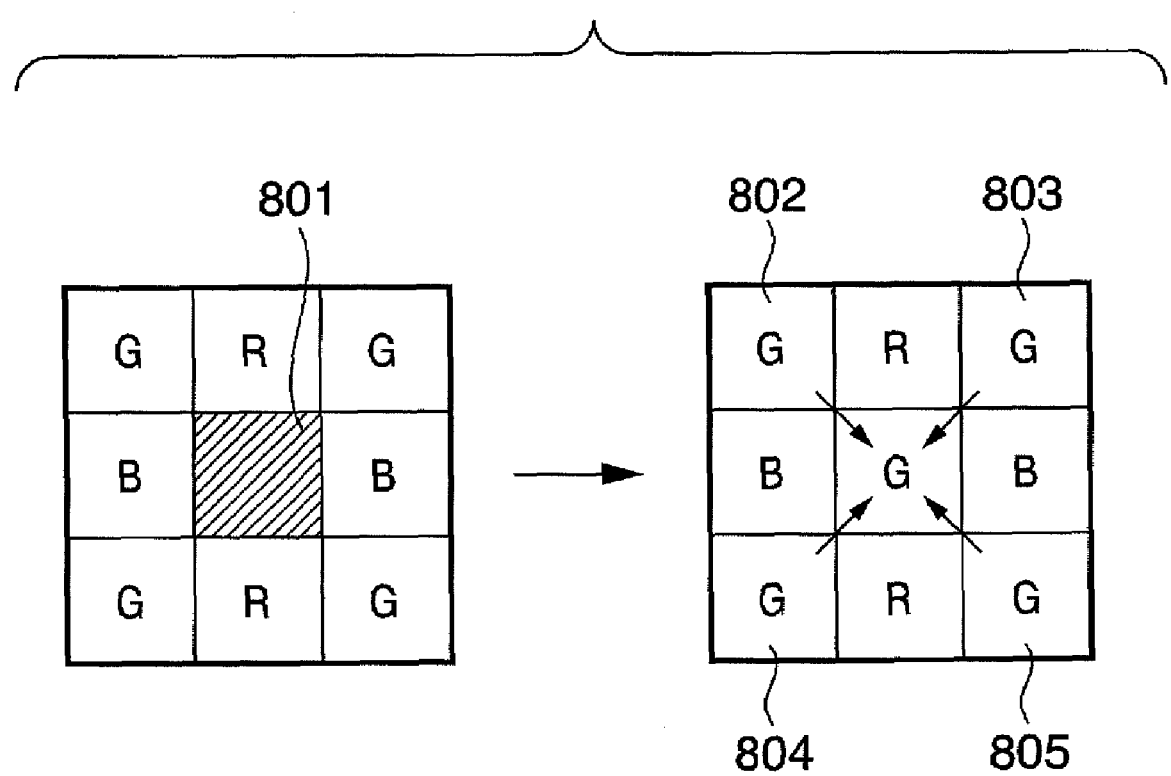
FIG. 8 shows an example of defective pixel correction.

FIG. 8 shows an example of defective pixel correction. As shown in FIG. 8, when a pixel 801 of the image sensor 101 is defective, G component data that normally would be obtained at the pixel 801 cannot be obtained. Accordingly, the G component of the pixel 801 is interpolated based on G component pixels present in the vicinity of the pixel 801 (by averaging the G component values of pixels 802, 803, 804, and 805 for example).

A color separation circuit 104 identifies the Bayer arrangement of the image data to separate and extract R components, G components, and B components.

Figure 9:
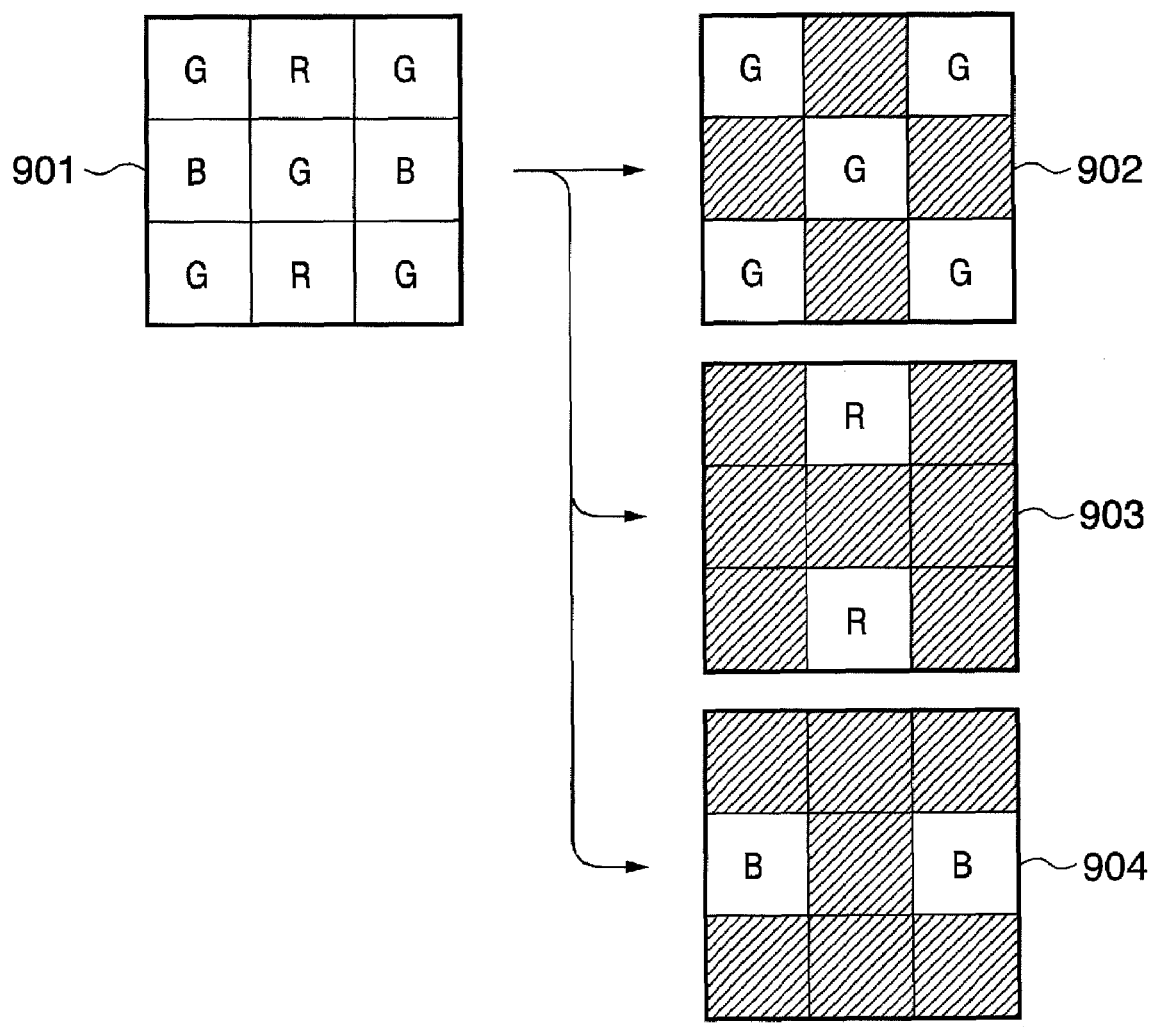
FIG. 9 shows an example of color separation processing.

FIG. 9 shows an example of color separation processing. It should be noted that display is given here extracting some of the pixel lines among the multitude of pixels arranged in the image sensor 101.

As shown by reference numbers 902, 903, and 904, the color separation circuit 104 separates and extracts G components, R components, and B components of the image data output from the pixel lines 901 of the Bayer arrangement.

Figure 3:
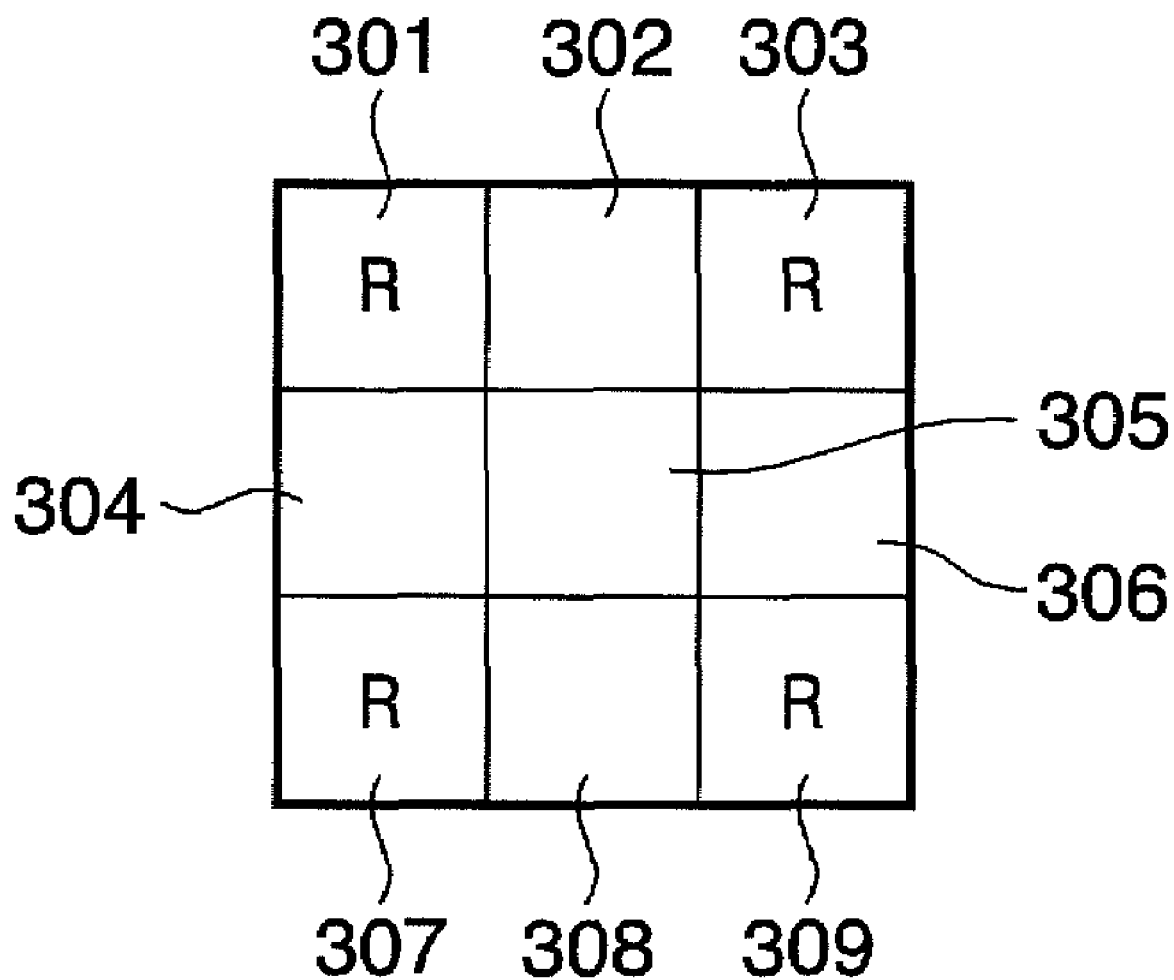
FIG. 3 shows an example of R component interpolation processing.

An R interpolation circuit 105 interpolates R components in pixels where no R component is held in the image data. The R interpolation circuit 105 interpolates R components without referring to other color components (namely, G components and B components). FIG. 3 shows an example of R component interpolation processing. In FIG. 3, a pixel having an R component is referred to as a "valid pixel" and a pixel not having an R component is referred to as an "invalid pixel." When interpolating an R component for an invalid pixel 302, the R interpolation circuit 105 obtains an average value of R component values in neighboring valid pixels 301 and 303 and sets this as the R component value of the invalid pixel 302. Interpolation is similarly performed for R components of invalid pixels 304, 306, and 308. The R component of the invalid pixel 305 is interpolated using an average value of R component values in valid pixels 301, 303, 307, and 309.

A B interpolation circuit 106 interpolates B components in pixels where no B component is held in the image data. The B interpolation circuit 106 interpolates B components without referring to other color components (namely, R components and G components). A specific interpolation method is the same as the R component interpolation method described with reference to FIG. 3.

A magnification chromatic aberration correction circuit 107 corrects magnification chromatic aberration in the image data. In the present embodiment in particular, R components and B components are corrected based on the G components of the image data. Consequently, the magnification chromatic aberration correction circuit 107 varies the values of the R components and B components in the image data but does not vary the values of the G components. An example of magnification chromatic aberration correction processing is described with reference to FIG. 5, FIG. 6, and FIG. 10.

Figure 10:
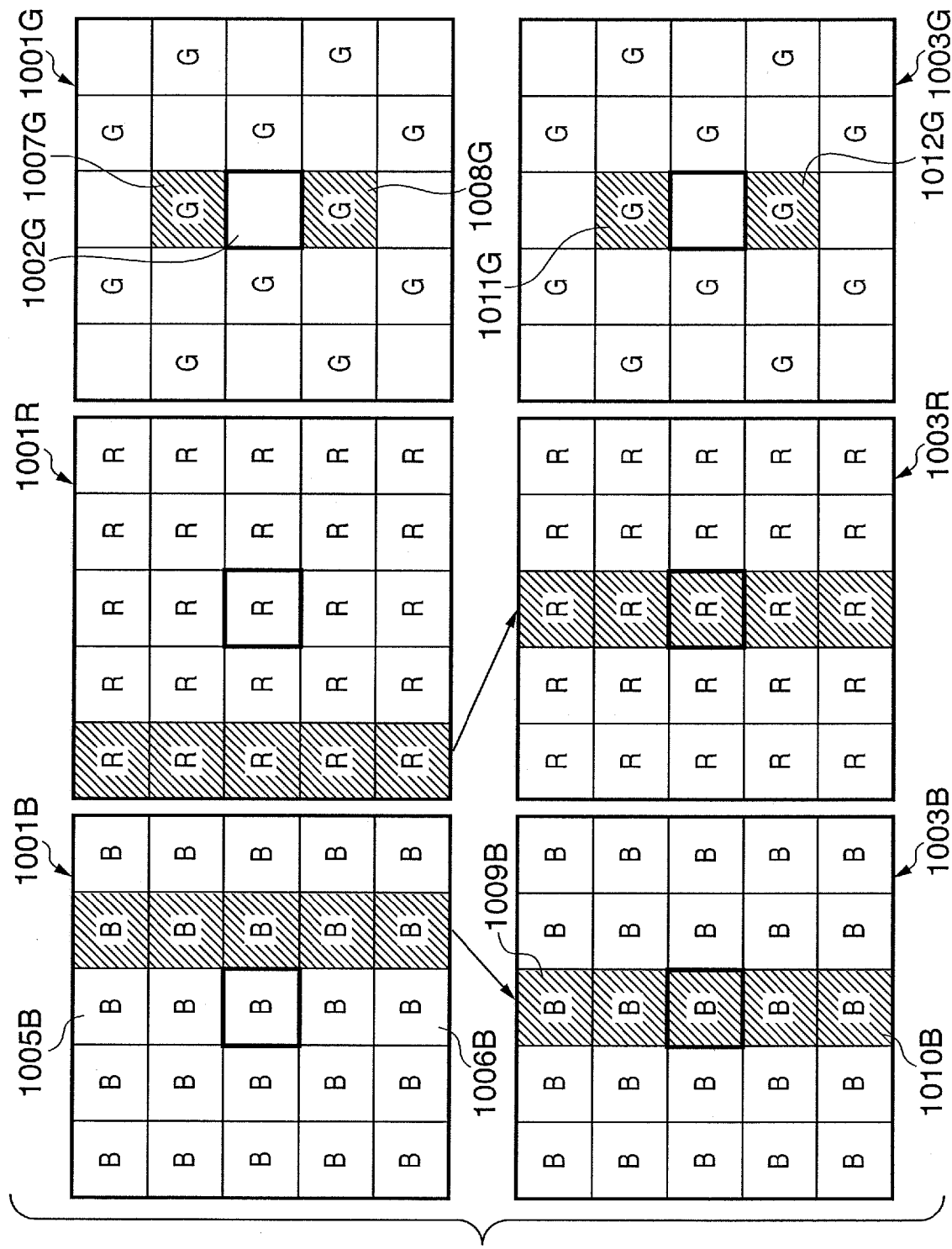
FIG. 10 shows an example of magnification chromatic aberration correction processing.

For example, consider a case of capturing an object having a black vertical line on a white background. In FIG. 10, a pixel group 1001B is B component data that can be obtained by the B interpolation circuit 106. A pixel group 1001R is R component data that can be obtained by the R interpolation circuit 105. A pixel group 1001G is G component data that can be obtained by the color separation circuit 104. Although the black vertical line should be present in the same position with respect to each of the RGB components, the position of the black vertical line varies in each of the RGB components since the optical lens 100 has different refractive indexes depending on the wavelength.

Figure 5:
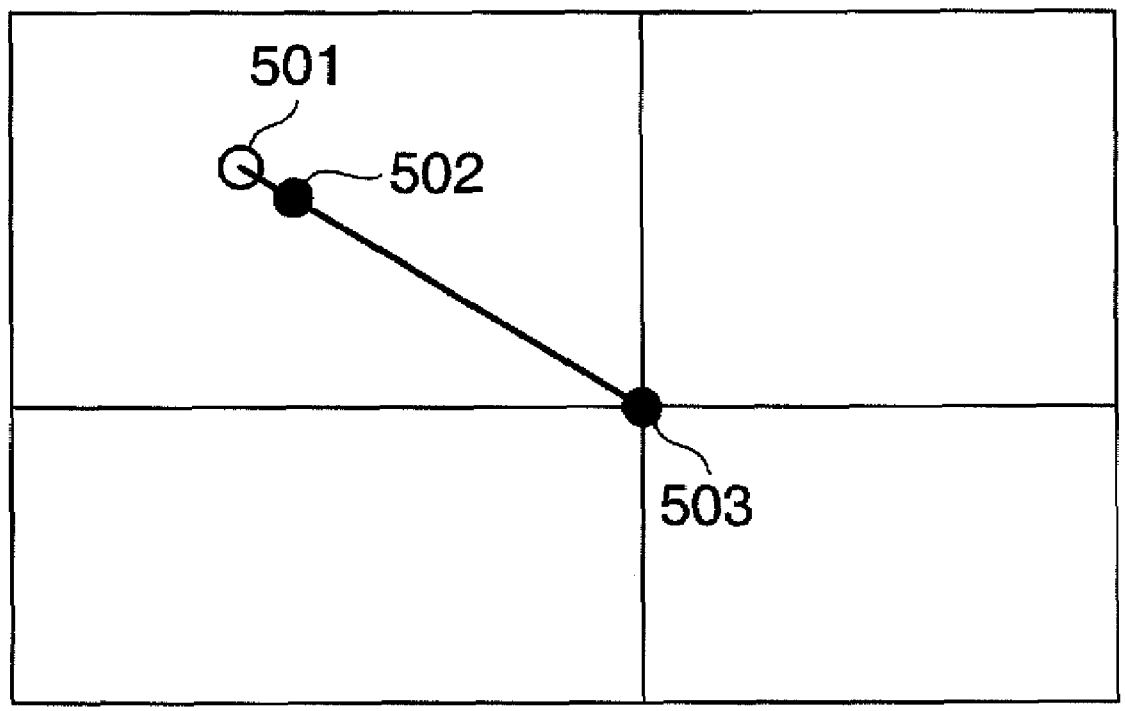
FIG. 5 shows an example of magnification chromatic aberration correction processing and distortion aberration correction processing.
Figure 6:
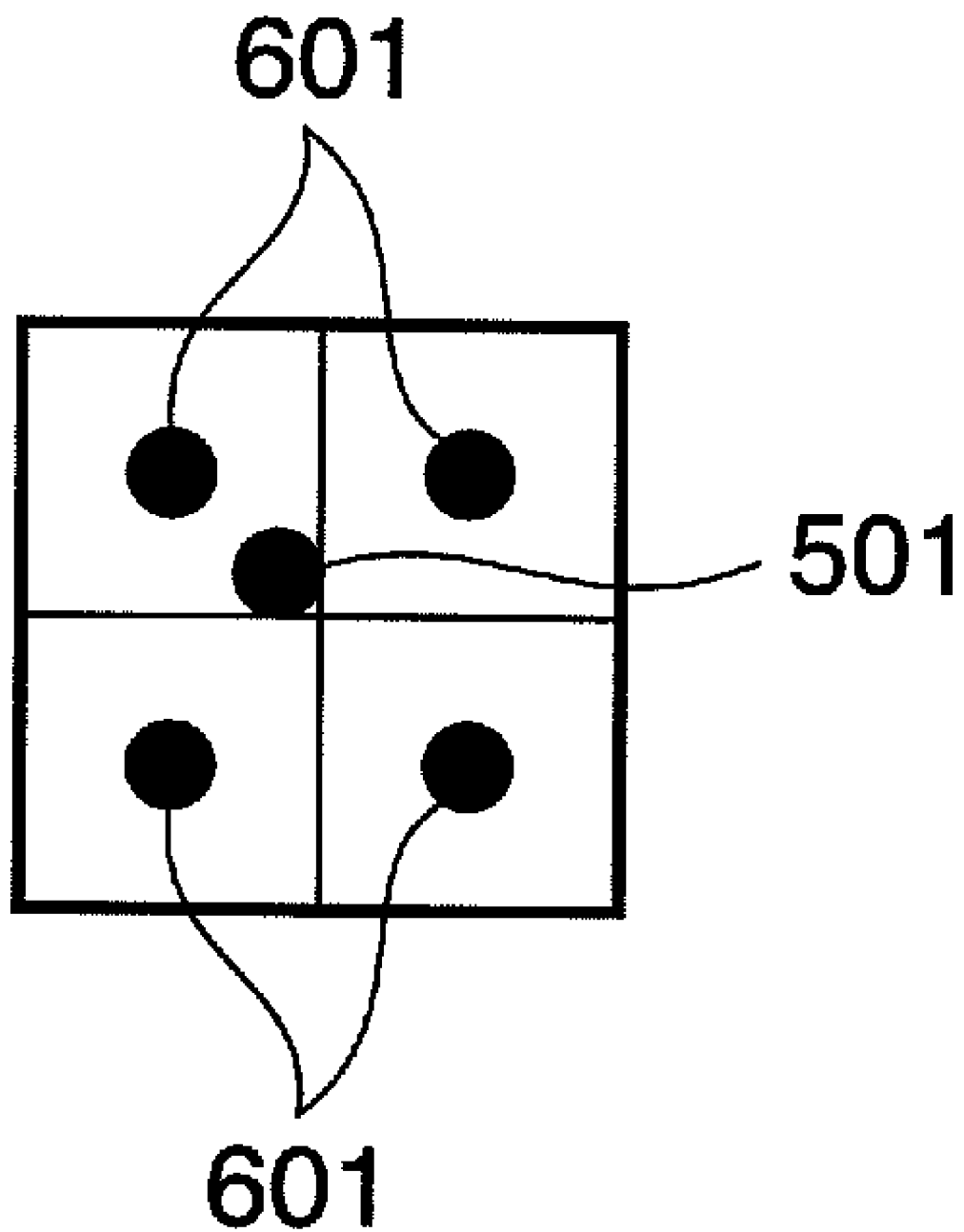
FIG. 6 shows an example of magnification chromatic aberration correction processing and distortion aberration correction processing.

Accordingly, as shown in FIG. 5, based on information intrinsic to the optical lens 100 and positional information of an optical center 503 in the image, the magnification chromatic aberration correction circuit 107 acquires information that indicates a corresponding relationship between a position of a predetermined pixel 502 and a position 501 of where an actual value of the pixel 502 should be. Then, the value of the color component of the pixel 502 is replaced by the value of the color component of the position 501. At this time, the position 501 is generally displaced from the position of the actual pixel on the image sensor 101. That is, as shown in FIG. 6, four pixels 601 are actual pixels on the image sensor 101 and the position 501 is present therebetween. Accordingly, the magnification chromatic aberration correction circuit 107 obtains the value of the color component of the position 501 by performing linear interpolation on the color components of the four pixels 601.

Information intrinsic to the optical lens 100 used in magnification chromatic aberration correction processing is different for the R components and B components. And, as in the case of shading correction processing, this information is stored in the memory (not shown in the drawings) provided in the optical lens itself, the memory (not shown in the drawings) provided in the digital camera 150, or the like.

As a result of magnification chromatic aberration correction processing, the positions of the black vertical line are made to match as indicated by pixel groups 1003B, 1003R, and 1003G in FIG. 10.

Figure 4:
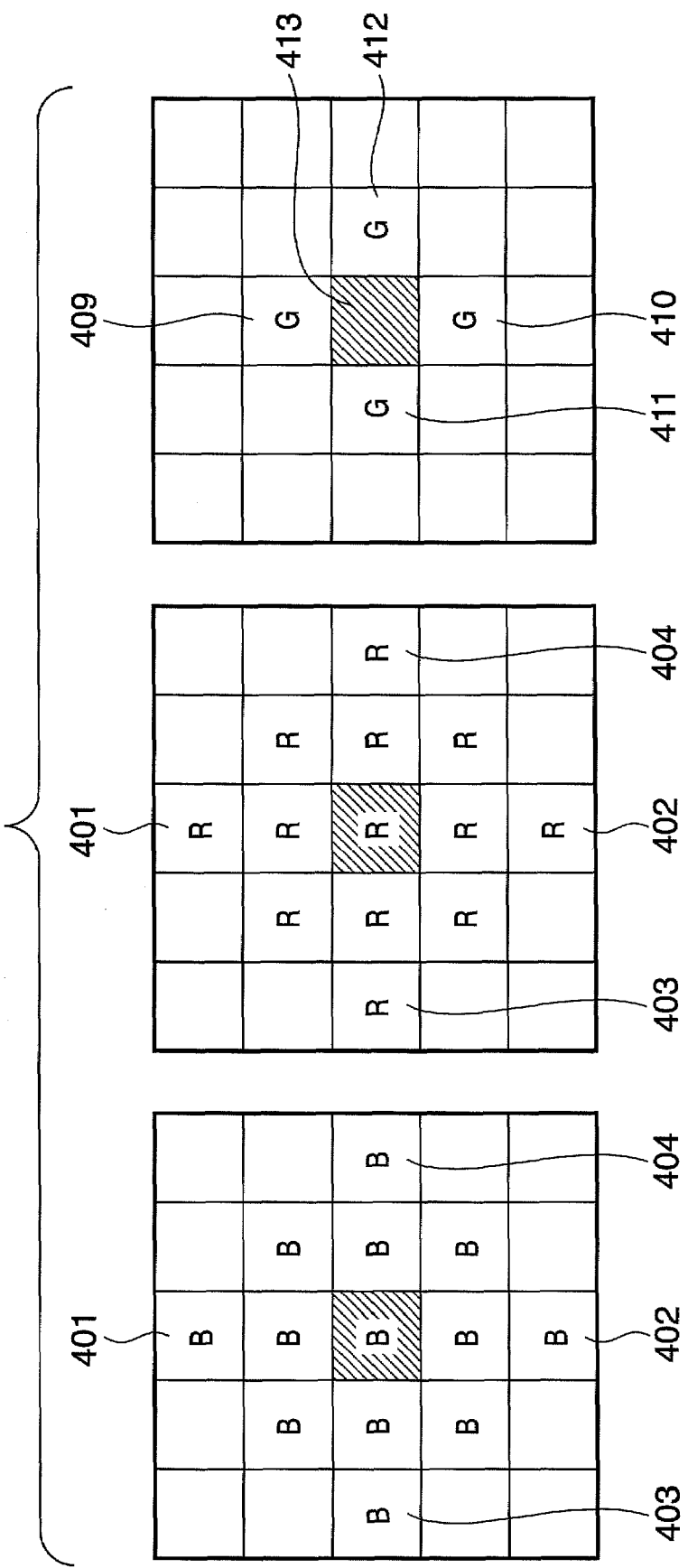
FIG. 4 shows an example of G component interpolation processing.

A G interpolation circuit 108 interpolates G components of the pixels by referring to R components and B components, which are the output of the magnification chromatic aberration correction circuit 107. FIG. 4 shows an example of G component interpolation processing. An interpolation target pixel 413 is interpolated based on one pixel above and one pixel below (a pixel 409 and pixel 410) or one pixel to the right and one pixel to the left (a pixel 411 and pixel 412) from the pixel 413. The G interpolation circuit 108 uses a correlation of neighborhood B components or R components to determine whether to use the pixel 409 and pixel 410 or the pixel 411 and pixel 412. For example, the G interpolation circuit 108 compares an absolute value of a difference in values of B components (or R components) of the pixel 401 and pixel 402 and an absolute value of a difference in values of B components (or R components) of the pixel 403 and pixel 404. It then averages the values of G components of pixels in a same direction as that whose absolute value of difference is smaller, and sets the average value as the value of the G component of the pixel 413.

An important point in the G interpolation processing of the present embodiment is that the G component to be used in G interpolation processing is determined based on R components or B components that have undergone magnification chromatic aberration correction. That is, when interpolating a pixel 1002G for example as shown in FIG. 10, there is little meaning in obtaining the absolute value of differences in values of B components in a pixel 1005B and pixel 1006B prior to correcting the magnification chromatic aberration. This is because there is a high probability that, prior to correcting chromatic differences of magnification, the pixel 1005B and pixel 1006B will not be pixels that neighbor a pixel 1007G and pixel 1008G in the object due to color displacement caused by magnification chromatic aberration. On the other hand, if this is after magnification chromatic aberration correction processing, then determining whether or not to use a pixel 1011G and pixel 1012G in G interpolation processing based on a pixel 1009B and pixel 1010B will contribute to improved image quality.

A signal processing circuit 109 carries out image quality adjustment processing on the image data such as gamma correction and aperture correction.

A distortion aberration correction circuit 110 corrects distortion aberration in the image data. Distortion aberration correction processing is carried out in a same manner as the magnification chromatic aberration correction processing that was described with reference to FIG. 5 and FIG. 6. However, information intrinsic to the optical lens 100 used in distortion aberration correction processing is the same for all the color components.

Figure 11:
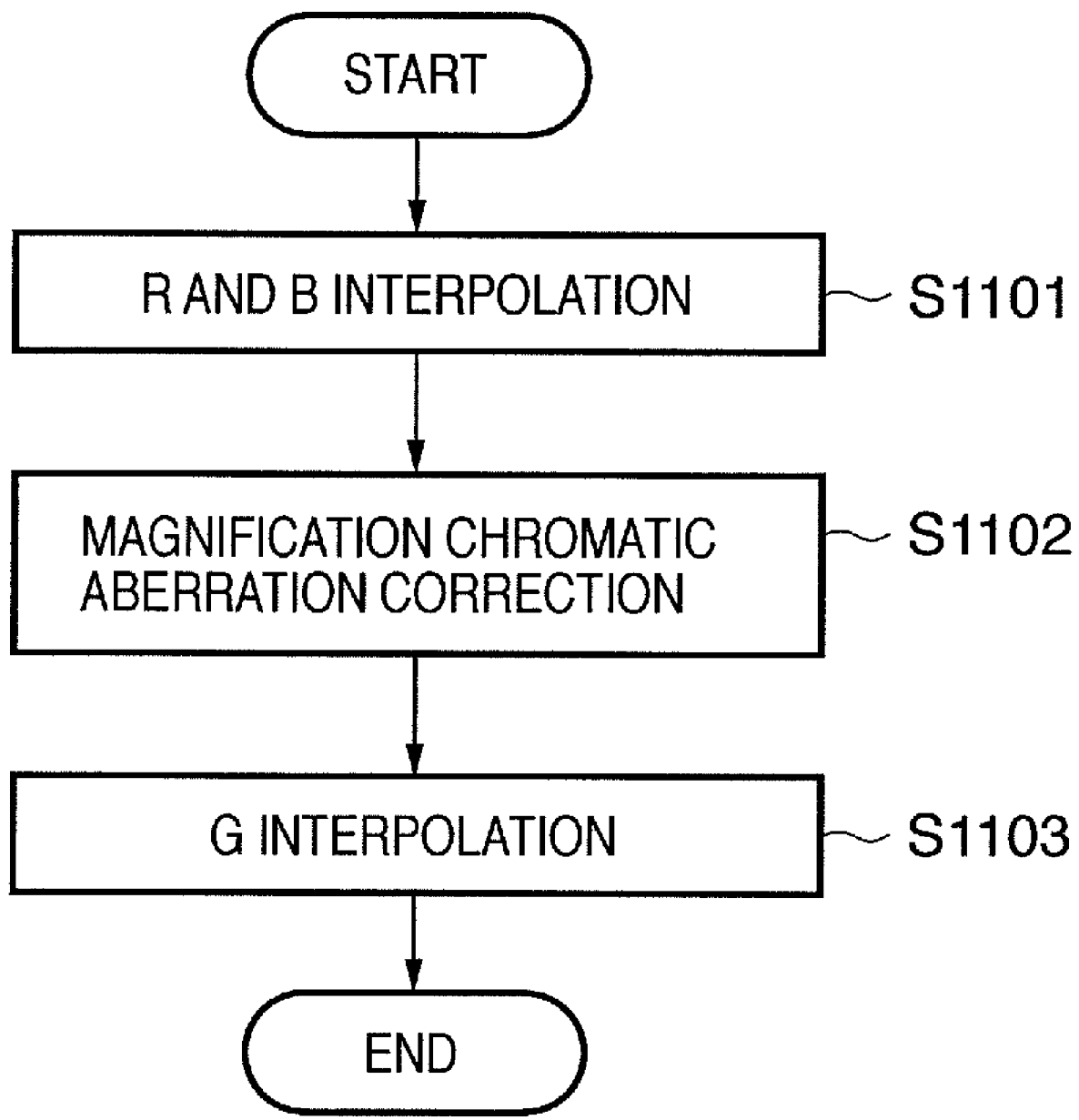
FIG. 11 is a flowchart showing a flow of image processing according to the first embodiment.

FIG. 11 is a flowchart showing a flow of image processing according to the present embodiment. Each of the steps shown in FIG. 11 is achieved by a structural element or the like such as an unshown CPU of the digital camera 150 and the R interpolation circuit 105. Furthermore, FIG. 11 merely shows a portion of the image processing and various image processes such as shading correction processing may be carried out prior to step S1101 and various image processes such as distortion aberration correction processing may be carried out after step S1103.

In step S1101, R component and B component interpolation processing is carried out on the image data.

In step S1102, magnification chromatic aberration correction processing is carried out on the image data.

In step S1103, G component interpolation processing is carried out on the image data.

As described above, with the present embodiment, the digital camera 150 first carries out R component and B component interpolation processing on the image data. Then, magnification chromatic aberration correction processing is carried out on the image data that has undergone R component and B component interpolation processing. Then, G component interpolation processing is carried out on the image data that has undergone magnification chromatic aberration correction processing. In carrying out G component interpolation processing, a determination is made as to the G components of which pixels to use in the interpolation processing based on R components or B components of the image data that has undergone magnification chromatic aberration correction processing.

This makes it possible to improve the quality of image data obtained as a result of image processing in image processing that includes at least pixel interpolation processing and magnification chromatic aberration correction processing.

Other Embodiments

The processing described in the above embodiments may be realized by providing a storage medium, storing program code (software) realizing the above-described functions, to a computer system or apparatus. By reading the program code stored in the storage medium with a computer (or a CPU or MPU) of the system or apparatus and executing them, the functions of the above-described embodiments can be realized. In this case, the program code read from the storage medium realize the functions according to the embodiments. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program code read by the computer. The present invention also includes a case where an OS (operating system) or the like working on the computer performs part or the entire processes in accordance with designations of the program codes and realizes the functions according to the above embodiments.

Furthermore, the program code read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program code and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188690, filed on Jul. 7, 2006, which is hereby incorporated by reference herein in its entirety.

What is claimed is:

1. An image processing apparatus that generates second image data by interpolating color components of pixels in first image data, which has been obtained by photo-electric conversion and includes first component pixel signals, second component pixel signals, and third component pixel signals, a number of the third component pixel signals being greater than a number of the first component pixel signals and also being greater than a number of the second component pixel signals, comprising:

a first interpolation unit that interpolates first components in pixels of third components and second components in the first image data, a second interpolation unit that interpolates second components in pixels of first components and third components in the first image data, a magnification chromatic aberration correction unit that carries out correction of chromatic differences of magnification in the first image data, which has undergone first component interpolation by the first interpolation unit and second component interpolation by the second interpolation unit, and a third interpolation unit that interpolates third components in pixels that do not include third components in the first image data, which has undergone correction of chromatic differences of magnification by the magnification chromatic aberration correction unit.

2. The image processing apparatus according to claim 1, wherein the first component pixel signals are red component pixel signals, the second component pixel signals are blue component pixel signals, and the third component pixel signals are green component pixel signals, and the first image data is lined up in a Bayer arrangement.

3. The image processing apparatus according to claim 2, further comprising:

a comparison unit that compares a first correlation, which is a correlation between red components or blue components in pixels two pixels above and two pixels below from an interpolation target pixel, and a second correlation, which is a correlation between red components or blue components that are the same color components as the color components relating to the first correlation in pixels two pixels left and two pixels right from the interpolation target pixel in the first image data, which has undergone correction of chromatic differences of magnification by the magnification chromatic aberration correction unit, wherein the third interpolation unit interpolates a green component based on green components of pixels one pixel above and one pixel below from the interpolation target pixel when the first correlation is greater than the second correlation, and interpolates a green component based on green components of pixels one pixel left and one pixel right from the interpolation target pixel when the second correlation is greater than the first correlation.

4. The image processing apparatus according to claim 2, wherein in the first image data prior to red component interpolation, the first interpolation unit interpolates the red component based on the red component of pixels one pixel above and one pixel below from the interpolation target pixel when the pixels one pixel above and one pixel below from the interpolation target pixel are red component pixels, interpolates the red component based on the red component of pixels one pixel left and one pixel right from the interpolation target pixel when the pixels one pixel left and one pixel right from the interpolation target pixel are red component pixels, and interpolates the red component based on the red component of pixels one pixel upper right, one pixel upper left, one pixel lower right, and one pixel lower left from the interpolation target pixel when the pixels one pixel upper right, one pixel upper left, one pixel lower right, and one pixel lower left from the interpolation target pixel are red component pixels.

5. The image processing apparatus according to claim 2, wherein in the first image data prior to blue component interpolation, the second interpolation unit interpolates the blue component based on the blue component of pixels one pixel above and one pixel below from an interpolation target pixel when the pixels one pixel above and one pixel below from the interpolation target pixel are blue component pixels, interpolates the blue component based on the blue component of pixels one pixel left and one pixel right from the interpolation target pixel when the pixels one pixel left and one pixel right from the interpolation target pixel are blue component pixels, and interpolates the blue component based on the blue component of pixels one pixel upper right, one pixel upper left, one pixel lower right, and one pixel lower left from the interpolation target pixel when the pixels one pixel upper right, one pixel upper left, one pixel lower right, and one pixel lower left from the interpolation target pixel are blue component pixels.

6. The image processing apparatus according to claim 2, further comprising a shading correction unit that carries out shading correction on the first image data prior to red component interpolation by the first interpolation unit and blue component interpolation by the second interpolation unit.

7. The image processing apparatus according to claim 2, further comprising a defective pixel correction unit that carries out defective pixel correction on the first image data prior to red component interpolation by the first interpolation unit and blue component interpolation by the second interpolation unit.

8. The image processing apparatus according to claim 2, further comprising a distortion aberration correction unit that carries out distortion aberration correction on the first image data, which has undergone green component interpolation by the third interpolation unit.

9. An image processing method that generates second image data by interpolating color components of pixels in first image data, which has been obtained by photo-electric conversion and in which first component pixel signals, second component pixel signals, and third component pixel signals, a number of the third component pixel signals being greater than a number of the first component pixel signals and also being greater than a number of the second component pixel signals, comprising:
  interpolating first components in pixels of third components and second components in the first image data;
  interpolating second components in pixels of first components and third components in the first image data;
  carrying out correction of chromatic differences of magnification in the first image data, which has undergone first component interpolation and second component interpolation; and
  interpolating third components in pixels that do not include third components in the first image data, which has undergone correction of chromatic differences of magnification.

* * * * *